W. M. WARREN.
PEANUT HARVESTER.
APPLICATION FILED JULY 30, 1914.

1,145,282.

Patented July 6, 1915.
2 SHEETS—SHEET 1.

Witnesses

W. M. Warren, Inventor by C. A. Snow & Co., Attorneys

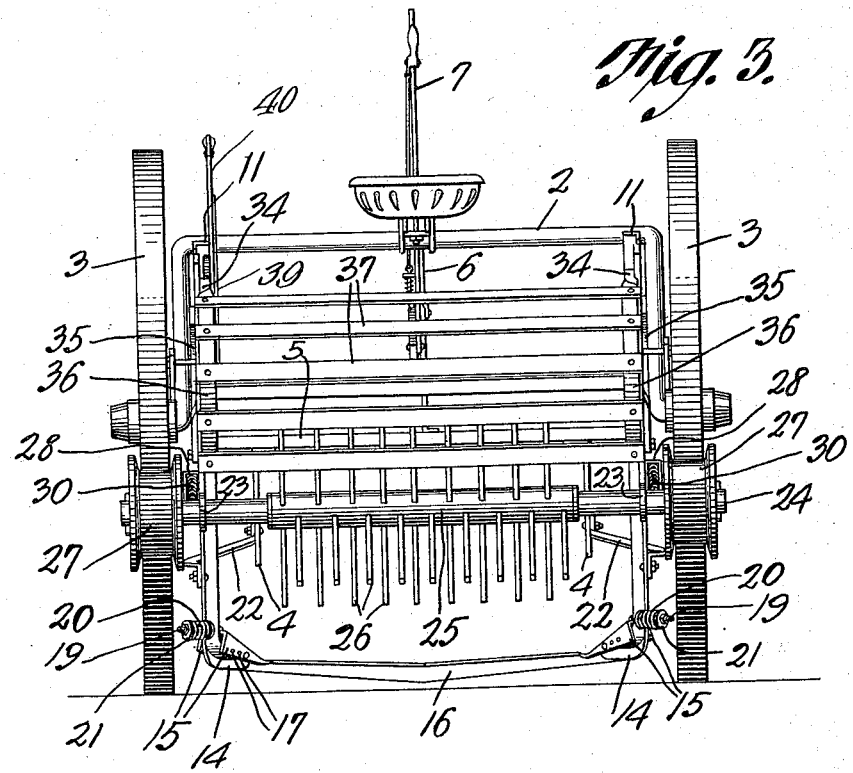
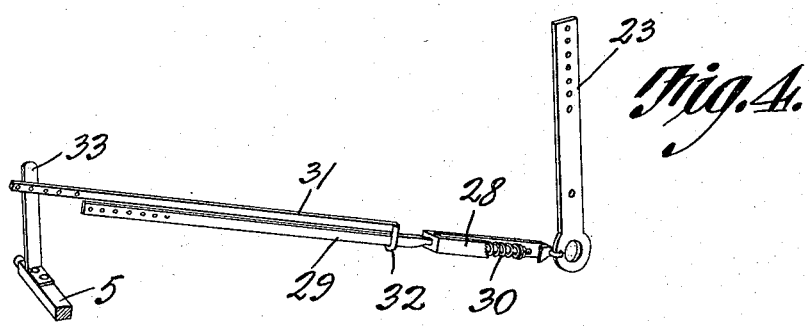
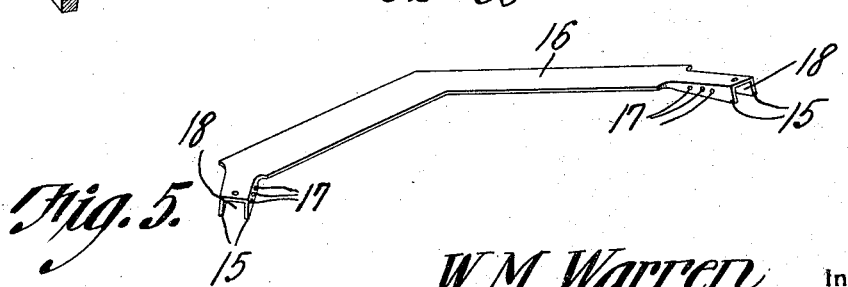

UNITED STATES PATENT OFFICE.

WILLIAM M. WARREN, OF CORINTH, TEXAS, ASSIGNOR OF ONE-HALF TO SOLOMON L. CARPENTER, OF CORINTH, TEXAS.

PEANUT-HARVESTER.

1,145,282. Specification of Letters Patent. Patented July 6, 1915.

Application filed July 30, 1914. Serial No. 854,152.

*To all whom it may concern:*

Be it known that I, WILLIAM M. WARREN, a citizen of the United States, residing at Corinth, in the county of Denton and State of Texas, have invented a new and useful Peanut-Harvester, of which the following is a specification.

This invention relates to machines for harvesting peanuts, one of its objects being to provide an attachment which can be applied readily to an ordinary cultivator and which will not only loosen the peanuts but will beat the dirt therefrom so that they will be deposited on the ground in a practically clean condition.

A further object is to provide an attachment which is simple in construction, can be readily applied to a cultivator and the beater of which receives motion from the cultivator wheels so that the use of chains and sprockets or other gearing becomes unnecessary.

Another object is to provide means whereby through the manipulation of a single lever, the digger can be adjusted to a desired elevation and the elevating cylinder can be shifted into and out of active relation with the supporting wheels.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

Figure 1:
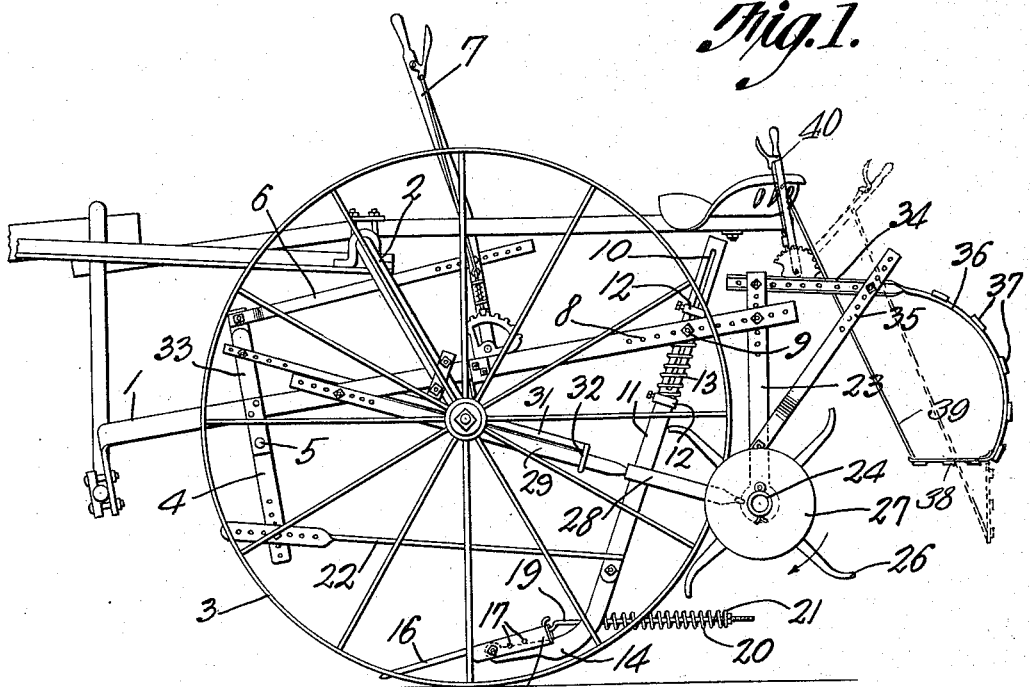
Figure 2:
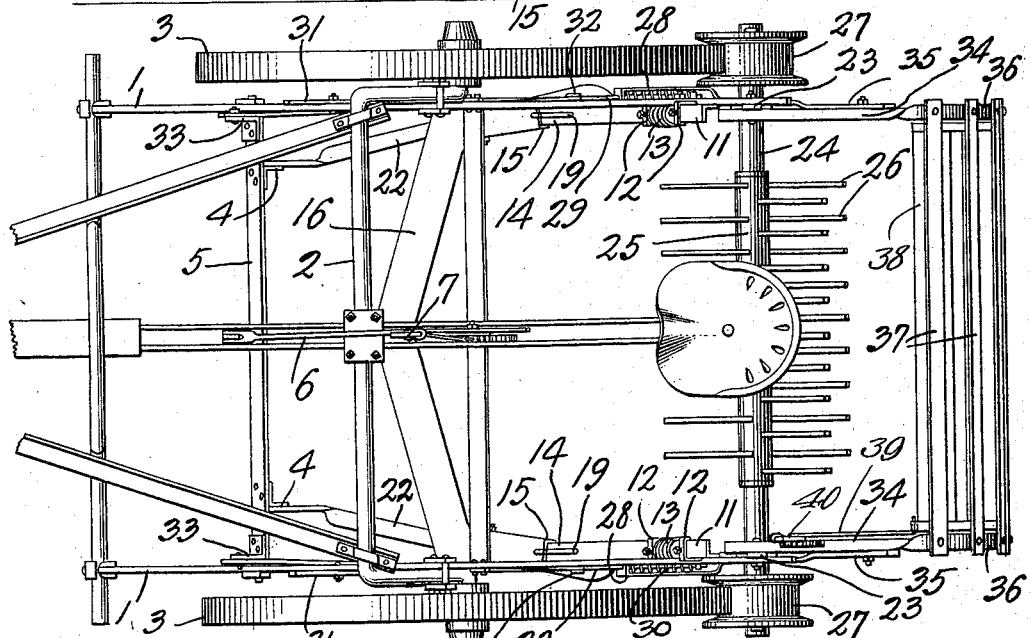

In said drawings:—Figure 1 is a side elevation of a peanut harvester embodying the present improvements. Fig. 2 is a plan view thereof. Fig. 3 is a rear elevation. Fig. 4 is a detail view of one of the cylinder hangers and its actuating means. Fig. 5 is a perspective view of the digger.

Referring to the figures by characters of reference 1 designates the frame of a cultivator, the same being supported by an arched axle 2 carried by supporting wheels 3, it being understood of course that this cultivator structure can be of any desired type. Levers 4 are fulcrumed on the sides of the frame and the upper ends of the levers are connected by a cross bar 5 which, in turn, has a strip 6 extending rearwardly therefrom to an actuating lever 7. Thus it will be seen that when the lever 7 is shifted back and forth, the two levers 4 will be actuated.

The rear end portion of each of the sides of frame 1 is formed with a longitudinal series of apertures 8 and a guide bolt 9 is adapted to be placed in any one of the apertures and to project into a longitudinal slot 10 formed within the upper portion of a standard 11. Collars 12 are secured to the standard at points above and below the bolt 9 and a spring 13 is mounted on each standard and between the lower collar 12 and the sides of frame 1 and serves to retard the upward movement of the standard relative to frame 1. A foot 14 is secured to the lower portion of each standard and each foot projects between depending flanges 15 formed at one end portion of a substantially V-shaped digging blade 16 the point of which is extended forwardly. The flanges 15 have apertures 17 whereby the feet can be adjusted longitudinally within the channels 18 formed between the flanges. A rod 19 is secured to each end portion of the blade 16 and is slidably mounted within the adjacent foot 14, each rod having a spring 20 mounted thereon and bearing at one end against the back of the foot 14 and at its other end against a collar 21 which is adjustably mounted on the rod 19. Thus the spring 20 pulls normally through rod 19 upon the end portion of blade 16 so as thus to cause the blade normally to occupy a predetermined plane. Obviously, however, should the front of the blade strike an unyielding obstruction, it will be free to swing downwardly back under the foot 14 so as to slip over the obstruction, the springs 20 yielding during this operation but promptly returning the blade to its initial position after the obstruction has been passed.

A rod 22 is pivotally connected to each of the standards 11 near the foot 14 and each of these rods 22 is also pivotally connected to the lower end portion of one of the levers 4.

Pivotally connected to and depending from each side of the frame 1 at points back of the standards 11 are hangers 23 within the lower end portions of which is journaled a shaft 24 carrying a cylinder 25. This cylinder has curved lifting fingers 26 extending therefrom, the said fingers being curved oppositely to the direction of rotation of the cylinder. Secured to each end of the shaft 24 is a friction wheel 27.

Secured to the lower end portion of each hanger 23 is a loop 28 extending to one side of the adjacent standard 11 and each loop is slidably mounted upon a connecting strip 29 secured to one side of the frame 1. A spring 30 is mounted in each loop and bears at one end against the loop 28 and at its other end against a collar on the strip 29 so as thus to exert a constant pull through the loop 28 upon the adjacent hanger 23. Consequently the wheels 27 normally bear with considerable pressure against the rims of the wheels 3. A rod 31 is provided with an eye 32 which is slidably mounted on the strip 29 and this eye is adapted to press against the loop 28 so as to hold said loop rearward out of its normal position and with spring 30 under compression. When the loops are thus held the wheels 27 are out of contact with the wheels 3. The rods 31 on the two strips 29 are connected to arms 33 movable with the cross bar 5.

Connected to the upper end portions of the hangers 23 are arms 34 provided with braces 35. These arms merge into downwardly curved extensions 36 connected by cross rods 37, thus forming a shield or abutment extending back of the upper portion of cylinder 25.

It will be apparent that when the lever 7 is adjusted forwardly, the rods 31 will be shifted on the side strips 29 so as to move the eyes 32 away from the loops 28. Consequently the springs 30 will be brought into play and will pull on the hangers 23 so as thus to bind the wheels 27 against the wheels 3. Consequently, as the machine is moved forward, the said wheels 27 will be rotated in the direction indicated by the arrow in Fig. 1. The blade 16 will cut under the peanuts, thus leaving them in the loosened soil under which the blade passes and the fingers 26 will engage the vines of the loosened peanuts and lift them over cylinder 25 and finally throw them violently against the shield or abutment made up of the curved extensions 36 and the slat 37. By reason of the forcible contact of the peanuts with this abutment, any dirt which may be adhering thereto will be beaten therefrom and the cleaned vines and nuts will thus drop onto the ground where they can subsequently be collected. By having the lost motion between the eyes 32 and the side members 29, it is possible to shift lever 7 so as to raise or lower the blade 16 to a certain extent without affecting the springs 30 and shifting the wheels 27 out of contact with the wheels 3.

As has heretofore been pointed out, should the blade 16 come into contact with an unyielding obstruction, it will be free to swing downwardly and to slide over the obstruction, after which it will return to active position.

It will be noted that the various parts are all so mounted as to be capable of numerous adjustments and that the entire structure can be produced as an attachment and applied readily to an ordinary form of riding cultivator.

As shown in the drawings, a frame 38 may be hingedly connected to the lower ends of the extensions 36, this frame being made up of slats and connections therebetween and being connected by a rod 39 to a lever 40. Thus it will be seen that when the frame is in a horizontal position, the vines thrown against the slats 37 will drop onto the frame and, after a desired number of vines have been accumulated, the frame can be lowered so as to deposit the vines in a pile on the ground.

It is to be understood of course that the grooved wheels 27 can be provided with felt or any other suitable material whereby slipping of the parts is prevented.

What is claimed is:—

1. A peanut harvester attachment for cultivators, including a digging blade, an abutment, a revoluble vine lifting element adapted to throw the loosened vines against the abutment, and means for frictionally engaging the supporting wheels of the cultivator for rotating said element.

2. A peanut harvesting attachment for cultivators, including a digging element, a fixed abutment, revoluble means between the abutment and the digging element for engaging the loosened vines and throwing them against the abutment, a friction wheel movable with said revoluble means, and yielding means for holding the wheel in engagement with a supporting wheel of the cultivator.

3. A peanut harvesting attachment for cultivators, including a digging element, a fixed abutment, revoluble means between the abutment and the digging element for engaging the loosened vines and throwing them against the abutment, a friction wheel movable with said revoluble means, yielding means for holding the wheel in engagement with a supporting wheel of the cultivator, a controlling lever, and means operated thereby during a portion of its movement for adjusting the digging element and, during the remainder of its movement for disengaging the friction wheel from the supporting wheel.

4. The combination with a wheel supported structure, a hanger depending therefrom, and a digging blade connected to the hanger, of an abutment fixedly connected to the structure, revoluble means for engaging vines loosened by the digger and throwing them against the abutment, a friction wheel movable with said means, spring controlled means for holding the friction wheel normally in engagement with the rim of the adjacent supporting wheel, a controlling lever, and separate means operated thereby for successively adjusting the digger and moving the friction wheel into or out of engagement with the supporting wheel.

5. The combination with a wheel supported structure, of spring controlled standards slidably connected thereto, a digging blade mounted upon the feet of the standards, an abutment connected to the wheel supported structure, and revoluble means actuated by one of the supporting wheels for engaging the loosened vines and throwing them against the abutment.

6. A peanut harvester attachment for cultivators, including an abutment, a frame movably connected to the abutment, a revoluble vine lifting element adapted to throw vines against the abutment and onto the frame, means for rotating said element, and means for actuating the frame to deposit the contents thereof upon the ground.

In testimony that I claim the foregoing as my own, I have hereto affixed my signature in the presence of two witnesses.

WILLIAM M. WARREN.

Witnesses:
A. R. McGINTIE,
J. L. STRINGER.

Copies of this patent may be obtained for five cents each, by addressing the "Commissioner of Patents, Washington, D. C."